United States Patent [19]

Fahey et al.

[11] Patent Number: 5,438,115
[45] Date of Patent: Aug. 1, 1995

[54] PROCESS FOR PREPARING POLY(ARYLENE SULFIDE) POLYMERS

[75] Inventors: Darryl R. Fahey, Bartlesville, Okla.; Owen H. Decker, Reading, Pa.; Carlton E. Ash, Sugarland, Tex.; Jon F. Geibel, Bartlesville, Okla.; Fernando C. Vidaurri, Jr., Bartlesville, Okla.; Lacey E. Scoggins, Bartlesville, Okla.; Harvey D. Hensley, Bartlesville, Okla.; Wei-Teh W. Shang, Bartlesville, Okla.; Jimmie J. Straw, Bartlesville, Okla.; Paul J. DesLauriers, Bartlesville, Okla.

[73] Assignee: Phillips Petroleum Company, Bartlesville, Okla.

[21] Appl. No.: 159,411

[22] Filed: Nov. 30, 1993

[51] Int. Cl.⁶ .............................. C08G 75/14

[52] U.S. Cl. ...................... 528/388; 528/322; 528/323; 528/480; 528/491; 528/492; 528/493; 528/494; 528/495

[58] Field of Search ............... 528/322, 323, 388, 480, 528/491, 492, 493, 494, 495

[56] References Cited

U.S. PATENT DOCUMENTS

| | | | |
|---|---|---|---|
| 3,790,536 | 2/1974 | Vidaurri, Jr. | 528/388 |
| 3,884,884 | 5/1975 | Scoggins et al. | 528/360 |
| 5,086,163 | 2/1992 | Scoggins et al. | 528/388 |

Primary Examiner—Melvyn I. Marquis
Assistant Examiner—Shelley A. Dodson
Attorney, Agent, or Firm—Beverly M. Dollar

[57] ABSTRACT

A process is provided for producing a poly(arylene sulfide) polymer which employs at least one base as a reactant, wherein the base is contacted with the polymerization reaction mixture incrementally during the polymerization.

17 Claims, 2 Drawing Sheets

PROCESS FOR PREPARING POLY(ARYLENE SULFIDE) POLYMERS

FIELD OF THE INVENTION

This invention relates to the production of poly(arylene sulfide), (PAS) polymers. In one aspect this invention relates to a process for the preparation of poly(arylene sulfide) polymers wherein a base is used as a reactant and is added incrementally throughout in the polymerization.

BACKGROUND OF THE INVENTION

Poly(arylene sulfide) polymers are generally known in the art and have been found useful due to their high chemical and thermal resistance. Processes for the preparation of such poly(arylene sulfide) polymers have been disclosed in the art. In a typical preparation, at least one dihaloaromatic compound, a sulfur source, and a polar organic compound are contacted under polymerization conditions. Often certain molecular weight enhancing agents are also added during the polymerization. During the polymerization, certain side reactions can occur which consume reactants and produce undesirable polymerization side-products. The production of the side-products reduces the yield of the desirable polymer product; moreover, the presence of the side-products in the recovered polymer can cause polymer processing problems such as off-gassing, spinneret die-face build-up and mold plate-out. Processes have been employed to remove the undesirable side-products, but such processes result in increased production time and costs and necessitate the disposal of the removed material. It would therefore be desirable to have a method for reducing the amount of side-products produced in the PAS polymerization process.

OBJECTS OF THE INVENTION

It is an object of this invention to provide a process for preparing a poly(arylene sulfide) polymer which reduces the amount of undesirable side-products produced during the polymerization.

SUMMARY OF THE INVENTION

In accordance with this invention, poly(arylene sulfide) polymers are prepared by contacting a polymerization reaction mixture comprising at least one dihaloaromatic compound, a sulfur source, and a polar organic compound with a base under polymerization conditions, where the base is added incrementally throughout the polymerization.

This invention polymerization process results in the production of reduced amounts of undesirable side-products.

This invention polymerization process further results in an improvement in the efficiency of monomer usage in the polymerization.

DETAILED DESCRIPTION OF THE INVENTION

Figure 1:
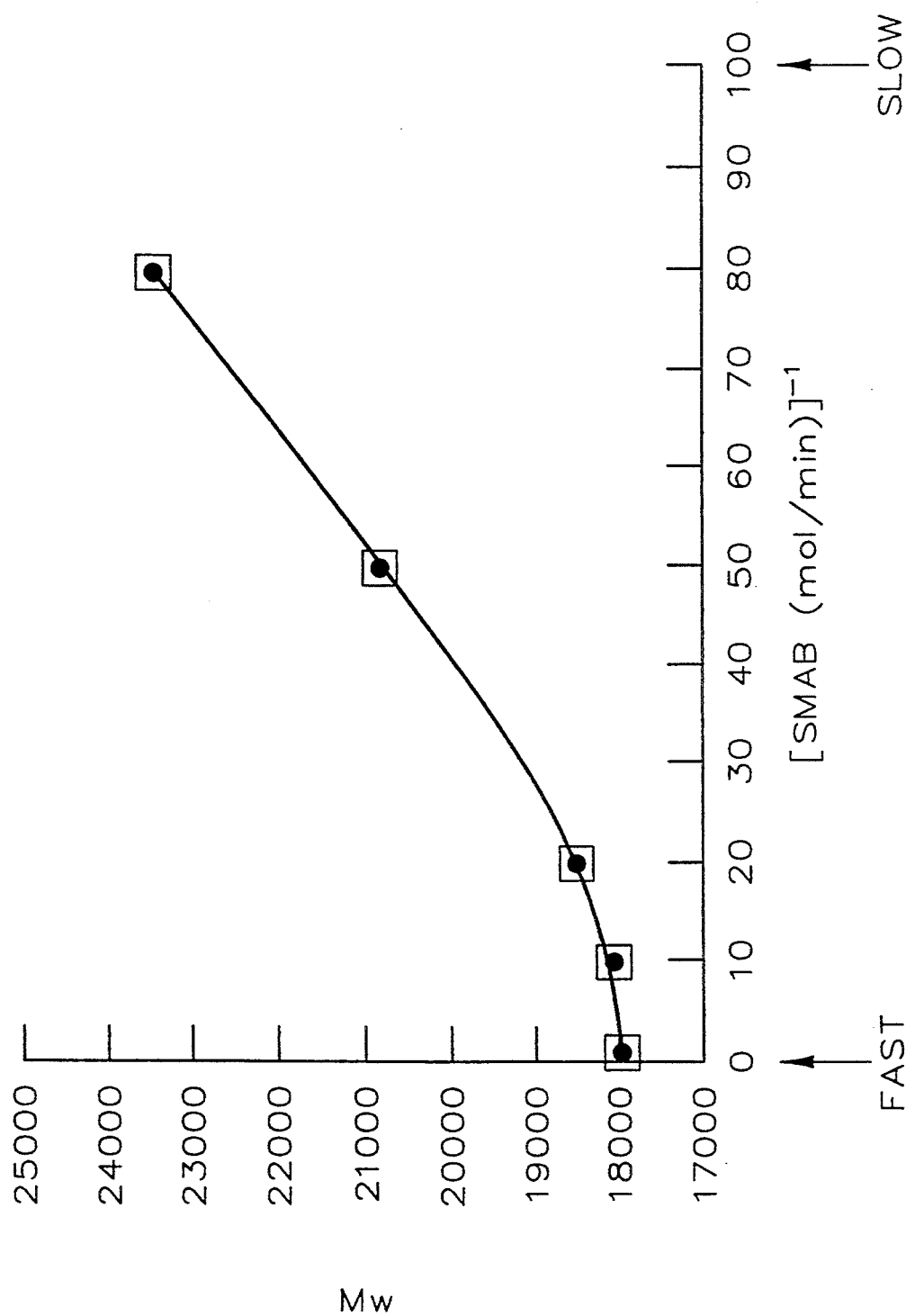
FIG. 1 graphically represents the relationship between the final polymer molecular weight and the incremental addition of the base sodium N-methyl-4-aminobutanoate (SMAB) as a reactant in the polymerization.

The poly(arylene sulfide) polymer is prepared according to this invention by contacting a polymerization reaction mixture comprising at least one dihaloaromatic compound, a sulfur source, and a polar organic compound with at least one suitable base under polymerization conditions.

Dihaloaromatic compounds which can be employed in the process of this invention can be represented by the formula

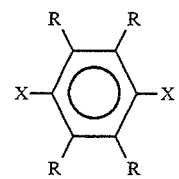

where each X is selected from the group consisting of chlorine, bromine, and iodine, and each R is selected form the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24. While the halogen atoms can be in any position in the dihaloaromatic compound, it is preferred to employ p-dihalobenzenes as the dihaloaromatic compound.

Examples of suitable p-dihalobenzenes include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene. 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene and the like, and mixtures of any two or more thereof. The preferred dihaloaromatic compound for use in this invention is p-dichlorobenzene (DCB) due to availability and effectiveness.

Any suitable sulfur source can be employed in the process of this invention. Suitable sulfur sources are disclosed in U.S. Pat. No. 3,919,177, which is hereby incorporated by reference. Such suitable sulfur sources include, but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides and hydrogen sulfide. It is presently preferred to use an alkali metal bisulfide as the sulfur source.

Alkali metal bisulfides which can be employed in the process of this invention include lithium bisulfide, sodium bisulfide, potassium bisulfide, rubidium bisulfide, cesium bisulfide, and mixtures thereof. Preferably, the alkali metal bisulfide is used as a hydrate or as an aqueous mixture. If desired, the alkali metal bisulfide can be prepared as an aqueous solution by the reaction of an alkali metal hydroxide with hydrogen sulfide in aqueous solution. It is preferred to use sodium bisulfide as the sulfur source in this invention.

The polar organic compounds useful in the present invention are solvents for the dihaloaromatic compounds and the sulfur source used in the production of poly(arylene sulfide) polymers. Examples of such polar organic compounds include amides, including lactams, and sulfones. Specific examples of such polar organic compounds include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N-dimethylacetamide, 1,3-dimethyl-2-imidazolidinone, low molecular weight polyamides, and the like. The polar organic compound presently preferred is NMP.

Suitable bases which can be used as a reactant in the invention process include those which are not strong nucleophiles and which are soluble in the reaction mixture or which can be made soluble in the reaction mixture due to the presence of, or by reaction with, other components of the reaction mixture. For example, a base which can be added according to this invention is sodium hydroxide. While sodium hydroxide typically has limited solubility in the reaction mixture, it can react with other components present to form a sodium aminoalkanoate which is soluble in the reaction mixture.

Suitable bases include, but are not limited to, non-nucleophilic amines, amides and aminoalkanoates having a pKa of about 6 or above. It is preferred to employ an alkali metal aminoalkanoate as the base in this invention, due to availability and effectiveness.

Suitable examples of amines and amides which can be used in this invention include 2,6-di(t-butyl)aniline, sodium di(t-butyl)amide, sodium di(o-tolyl)amide, and 2,2,6,6-tetramethylpiperidine.

Alkali metal aminoalkanoates which can be employed in the process of this invention can be represented by the formula

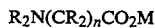

$R_2N(CR_2)_nCO_2M$ wherein each R is individually selected from the group consisting of hydrogen and hydrocarbyl radicals selected from cycloalkyl, and aryl, and combinations thereof such as alkaryl, aralkyl and like, the number of carbon atoms in each of said hydrocarbyl radicals being within the range of one to about 12, M is an alkyl metal selected from lithium, sodium, potassium, rubidium and cesium, n is an integer having a value of 1 to about 12, and the total number of carbon atoms in each molecule of the alkali metal aminoalkanoate is within the range of two to about 24.

Examples of some alkali metal aminoalkanoates which can be employed include lithium aminoacetate, sodium N,N-dimethyl-2-aminopropionate, potassium N-ethyl-3-cyclopentyl-3-aminopropionate, sodium N-methyl-4-aminobutanoate, sodium N-methyl-5-aminopentanoate, sodium N-methyl-6-aminohexanoate, rubidium N-isopropyl-3-phenyl-5-aminopentanoate, cesium N-butyl-N-cyclohexyl-3-isopropyl-6-aminohexanoate, potassium N-phenyl-3-butyl-7-aminooctanoate, sodium N-cyclopentyl-4-hexyl-10-aminodecanoate, lithium N-hexyl-6-pentyl-13-aminotridecanoate, sodium N-decyl-4-aminododecanoate, potassium N-nonyl-2-aminotetradecanoate, sodium N-o-tolyl-3-amino-4-phenylbutanoate, rubidium N,N-dibenzyl-2-tolyl-3-aminopropionate, cesium 4-amionobutanoate, sodium 5-aminopentanoate, potassium 6-aminohexanoate, and the like, and mixtures thereof. The presently preferred alkali metal aminoalkanoate is sodium N-methyl-4-aminobutanoate.

It is noted, as mentioned previously, that the alkali metal aminoalkanoate can be produced in situ by adding an alkali metal hydroxide to the reaction mixture, provided that a sufficient amount of water and an appropriate polar organic compound is present. In a preferred embodiment of this invention, sodium hydroxide is added incrementally to a reaction mixture containing N-methyl-2-pyrrolidone and water, thereby producing N-methyl-4-aminobutanoate.

It is within the scope of this invention to employ other components in the polymerization reaction mixture or during the polymerization. For example, molecular weight modifying or enhancing agents such as alkali metal carboxylates, lithium halides, or water can be added or produced during polymerization. Suitable alkali metal carboxylates which can be employed include those having the formula $R'CO_2M$ where $R'$ is a hydrocarbyl radical selected from alkyl, cycloalkyl, aryl, alkylaryl, arylalkyl, and the number of carbon atoms in $R'$ is in the range of 1 to about 20, and M is an alkali metal selected from lithium, sodium, potassium, rubidium and cesium. The alkali metal carboxylate can be employed as a hydrate or as a solution or dispersion in water. The preferred alkali metal carboxylate is sodium acetate due to availability and effectiveness.

The poly(arylene sulfide) polymer prepared by the invention method can be either high or low molecular weight polymer. When describing the polymer prepared by the invention method, the term low molecular weight poly(arylene arylene sulfide) polymer is generally meant to denote a poly(arylene sulfide) polymer having a melt flow value in the range of greater than 1000 g/10 min. to about 30,000 g/10 min. when measured according to ASTM D 1238, Condition 316/5, modified to use a 5-minute preheat time.

The term high molecular weight poly(arylene sulfide) polymer, as used herein, is generally meant to denote an essentially linear poly(arylene sulfide) polymer having a melt flow value less than or equal to about 1000 g/10 min when in an uncured state. Curing is defined herein as a distinct process step after polymer during comprising a thermal treatment of the polymer to reduce its melt flow rate. Essentially linear poly(arylene sulfide), as used herein, is defined as a polymer having no branching or such a small amount of branching as to have substantially no effect on the polymer properties. For example, the amount of polyhaloaromatic impurity found in the dihaloaromatic used in the poly(arylene sulfide) polymerization process would not be sufficient to cause the resultant poly(arylene sulfide) to be outside the essentially linear definition.

Generally, the ratio of reactants employed in the polymerization process can vary widely. It is preferred that the molar ratio of the amount of dihaloaromatic compound to amount of sulfur source be in the range of about 0.8/1 to about 2/1. If an alkali metal carboxylate is employed as a molecular weight modifying agent, it is preferred that the molar ratio of alkali metal carboxylate to dihaloaromatic compound be within the range of about 0.05/1 to about 4/1.

The amount of polar organic compound employed can vary during the polymerization over a wide range. Preferably, however, during polymerization the molar ratio of the amount of polar organic compound to the range of sulfur source is in the range of 1/1 to 10/1.

The amount of suitable base which is contacted with the polymerization reaction mixture should generally be in the range of about 0.5 to about 4 moles per mole of sulfur source.

The components of the reaction mixture can be contacted with each other in any order. Generally, the suitable base is added to the combined mixture of the other components of the polymerization reaction mixture incrementally during the polymerization. By "incremental addition", it is meant that the base is added in portions at spaced intervals or is added continuously. It is noted that if the base contains a significant amount of water, it is preferred that an initial charge of base be contacted with the sulfur source and polar organic compound under conditions sufficient to remove at least a portion of the water prior to addition of the dihaloaromatic compound and commencement of the polymerization. The base which is added at a later point during the polymerization will not typically adversely affect the polymerization even if relatively large amounts of water are associated with the base. It is preferred that at least 40% conversion of the dihaloaromatic monomer has taken place prior the addition of any base containing significant amounts of water.

Likewise, if the other components of the polymerization reaction mixture contain significant amounts of water, it is preferred to remove water in a dehydration step prior to commencement of the polymerization.

By significant amount of water, it is meant that the amount of water charged with the reactants prior to commencement of the polymerization is greater than about 0.3 moles per mole of sulfur source.

The incremental charges of base are preferably contacted with the polymerization reaction mixture during a time sufficiently prior to termination of the polymerization in order to allow reaction of the base with the polymerization reaction mixture. It is therefore presently preferred to contact the final charge of base with the polymerization reaction mixture at least 30 minutes prior to termination of the polymerization.

The term "commencement of the polymerization" as herein is defined as that point at which the polymerization reaction mixture is first subjected to polymerization conditions sufficient to initiate polymerization. The term "termination of polymerization", as used herein, is defined as that point at which an affirmative step is taken to effect a removal of the conditions necessary for polymerization to effectively continue, for example, by beginning the recovery of the poly(arylene sulfide) polymer from the polymer mixture. It must be noted that use of the term "termination of the polymerization" does not imply that complete reaction of the polymerization reaction components has occurred. It should also be noted that, as used herein, the term "termination of the polymerization" is not meant to imply that no further polymerization of the reactants can take place. Generally, for economic reasons, poly(arylene sulfide) polymer recovery is typically begun at a time when polymerization is substantially completed, that is, the increase in polymer molecular weight which would result from further polymerization is not significant enough to warrant the additional polymerization time.

The incremental addition of the base can be performed continuously throughout the polymerization, or small portions of the base can be charged at spaced intervals during the polymerization. It is presently preferred to charge the base continuously during the first portion of the polymerization cycle, then elevate the reaction temperature and allow the reaction to proceed for the remaining portion of the polymerization cycle.

Although the reaction temperature at which the polymerization is conducted can vary over a wide range, generally it will be within the range of about 170° C. (347° F.) to about 325° C. (617° F.), preferably about 200° C. to about 290° C. The reaction time can vary widely, depending in part on the reaction temperature, but generally will be within the range of about 10 minutes to about 72 hours, preferably about 1 hour to about 8 hours. The pressure should be sufficient to maintain the polar organic compound and the dihaloaromatic compound substantially in the liquid phase.

The poly(arylene sulfide) polymer prepared according to this invention can be recovered by any method known to those of ordinary skill in the art.

The following examples are provided in order to further illustrate the invention, but are not intended to be limiting of the scope thereof.

EXAMPLES

Example I

This example illustrates the general preparation of a poly(p-phenylene sulfide) polymer, (PPS), according to the method disclosed in U.S. Pat. No. 3,919,177, and the analysis of the side-products produced during the polymerization that can remain in the purified polymer. A mixture of 72.6 lbs of a 50 weight percent sodium hydroxide (NaOH) aqueous solution with 86.8 lbs of a 60 weight percent sodium hydrosulfide (NaSH) aqueous solution was prepared. This solution, 25 lbs of sodium acetate (NaOAc) powder, and 27.5 gal of N-methyl-2-pyrrolidone (NMP) were added to a stirred (400 rpm) reactor, which was then purged with nitrogen. This mixture was heated to remove water while the temperature increased to about 410° F.

Then 135.9 lbs of p-dichlorobenzene (DCB) and 6 gals of NMP were charged to the reactor. The mixture was heated to about 460° F. and held for 35 minutes, then was heated to 510° F. and held for 90 minutes, then was heated to 540° F.

Then the reaction mixture was removed from the reactor through a control valve into a vessel maintained at a pressure about 1 psi above atmospheric pressure, thereby resulting in the vaporization of most of the NMP and solidification of the PPS polymer. The dry, salt-filled polymer was twice washed with 120 gal of deionized water at ambient temperature, then filtered, then was washed with 80 gal of deionized water containing 75 g calcium hydroxide at 350° F. for 30 minutes. The solution was filtered to recover the PPS.

This PPS material was used in the formation of fibers. During fiber spinning, off gassing occurred, and a brown semi-solid material was collected in the cold trap of the vacuum venting assembly of the extruder. While not wishing to be bound by theory, this material was believed to contain a portion of the undesirable side-products produced during the polymerization which cause off-gassing and plate-out during polymer processing.

The semi-solid material was analyzed by GC/mass spectrometry (MS) and RP-HPLC. GC/MC analyses were accomplished on a Finnigan TSQ70 instrument using a 25-meter fused silica capillary column coated with crosslinked methyl silicone film and programmed from 30° to 310° C. Reverse Phase High Performance Liquid Chromatography (RP-HPLC) analyses were accomplished by using a μ-Bondapak C-18 column and CH₃/CN/CH₂Cl₂ as the mobile phase on a Hewlett Packard 1090 Liquid Chromatograph equipped with a photodiode-array UV detector.

Table I reports the results of the analyses.

TABLE I

Materials Identified in the Condensate from PPS "Off-Gassing" During Fiber Extrusion

| Side Products | Normal Products |
|---|---|
| ClC$_6$H$_4$NHCH$_3$ | ClC$_6$H$_4$SC$_6$H$_4$Cl |
| ClC$_6$H$_4$OC$_6$H$_5$ | ClC$_6$H$_4$SC$_6$H$_4$SC$_6$H$_4$Cl |
| ClC$_6$H$_4$SC$_6$H$_5$ | Cyclic Tetramer of PPS |
| ClC$_6$H$_4$OC$_6$H$_4$Cl | Cyclic Pentamer of PPS |
| ClC$_6$H$_4$OC$_6$H$_4$OH | Cyclic Hexamer of PPS |
| ClC$_6$H$_4$SC$_6$H$_4$NHCH$_3$ | |
| ClC$_6$H$_4$SC$_6$H$_4$SC$_6$H$_5$ | |
| ClC$_6$H$_4$SC$_6$H$_4$OC$_6$H$_4$Cl | |
| C$_6$H$_5$OH (tr)[a] | |
| ClC$_6$H$_4$OH (tr) | ClC$_6$H$_4$Cl (tr) |
| ClC$_6$H$_4$NH$_2$ (tr) | NMP (tr) |
| ClC$_6$H$_4$NHC$_2$H$_5$ (tr) | |
| ⌐C$_6$H$_5$NCH$_2$CH$_2$CH$_2$CO⌐ (tr) | |
| ⌐ClC$_6$H$_4$NCH$_2$CH$_2$CH$_2$CO⌐ (tr) | |
| C$_6$H$_5$SC$_6$H$_5$ (tr) | |
| ClC$_6$H$_4$NCH$_3$C$_6$H$_4$Cl (tr) | |
| ClC$_6$H$_4$SC$_6$H$_4$SCH$_3$ (tr) | |
| C$_6$H$_5$SC$_6$H$_4$SC$_6$H$_5$ (tr) | |
| ClC$_6$H$_4$OC$_6$H$_4$SC$_6$H$_5$ (tr) | |
| ⌐ClC$_6$H$_4$SC$_6$H$_4$NCH$_2$CH$_2$CH$_2$CO⌐ (tr) | |

[a] tr denotes trace amount.

Example II

This example describes the effect of adding sodium N-methyl-4-aminobutanoate (SMAB) to a PPS polymerization incrementally.

A one-liter 316 stainless steel magnetically-stirred autoclave equipped with a paddle stirrer was charged with 95.304 g (1.00 mol) of hydrated NaSH (58.8%), 24.609 g (0.30 mol) of sodium acetate, 199.0 g (2.00 mol) of NMP, and 4.2 g (0.300 mol) of SMAB. The autoclave was closed and flushed with N$_2$. Nitrogen was then slowly bubbled into the mixture via a dip tube and was allowed to vent out the top of the autoclave through a cooled condensation trap as the stirred reactor was brought to 150° C. The temperature was then increased at a rate of 1° C./min to distill water from the reactor. When 39 g water had collected in the condensation trap, nitrogen addition was stopped, and the vent was closed. A warm solution of 148.18 g (1.008 mol) of p-DCB and 50.0 g of NMP was added, and the mixture as quickly brought to 220° C. The continuous slow addition of 150.04 g (1.008 moles) of SMAB in 106.0 g of NMP was immediately begun and was completed in 110 minutes. An ISCO metering pump was employed to pump the SMAB/NMP mixture into the reactor. The pump barrel and transfer lines were wrapped with electrically heated tape to maintain the temperature near 180° C. After SMAB addition was completed, the reactor temperature was raised to 265° C. and held for two hours. The reactor was cooled, and its contents were removed and suction filtered, washing with 80° C. deionized water. The yield of PPS (after drying at 9020 C. in a vacuum oven) was 104.2 g. The filtrate was further analyzed by RP-HPLC as described below and was found to contain 0.76 g (0.0030 mol) of the impurity sodium N-(4-chlorophenyl)-N-methyl-4-aminobutanoate (SCAB).

The SCAB impurity is believed to be a side-product form the polymerization which, when present as an impurity in the polymer, contributes to undesirable polymer characteristics such as color instability and off-gassing. SCAB is water soluble and most of the SCAB is typically extracted during water washing of the polymer. The formation of SCAB reduces the efficiency of DCB conversion to polymer, however, so minimization of SCAB formation is desirable.

Reaction filtrates in this Example (primarily NMP, water, residual monomer, and side product) were analyzed for SCAB. Raw samples (1 μL) were injected directly onto the RP-HPLC system without prior treatment. Since the aromatic moiety in SCAB is an ultraviolet light absorber, an ultraviolet detection system (254 nm) was used with the RP-HPLC. The presence of SCAB in the PPS filtrates were resulted in a characterized peak in the chromatograms. The chromatographic conditions for the analysis of aqueous SCAB solutions are described below.

All liquid chromatography was performed using a M200 series liquid chromatograph equipped with a M6000 A pumping system, a M440 monochromatic-absorbance detector operated at 254 nm, and a Model U6K syringe-loaded injection valve with a 2 mL loop (Waters Associates, Milford, Mass.). The column was packed with octadecylsilane material bonded to microparticulate silica gel (5 μm), Econosphere Reversed Phase (250 mm × 4.6 mm ID, Alltech Associates, Deerfield, Ill.). The mobile phase consisted of a 50:50 (v/v) solution of 0.1M ammonium phosphate buffer (pH 5) and methanol (HPLC grade, Fisher). The pH of the buffer solution was adjusted to 5.3 using concentrated ammonium hydroxide or phosphoric acid.

PPS filtrates were directly injected (1 μL) into the chromatograph. Under the above-described conditions, SCAB elutes as a sharp narrow peak in the form of its conjugate acid. This was confirmed by isolating the compound corresponding to the largest peak (ret. time=20.4 min; flow rate=0.9 mL/min) by fractionally collecting it as it eluted from the UV detector sample cell during RP-HPLC analysis. Mass spectroscopy of this compound (molecular ion:m/e=227) verified that it is the conjugate acid of SCAB.

Several additional polymerizations were performed as described above, except the amount of SMAB present initially was varied. The same total amount of SMAB was used in all the polymerizations, the remainder was added continuously as described above after reaching the polymerization temperature.

The polymers prepared in these runs were recovered as described above and the filtrates were analyzed for the presence of SCAB.

In addition, a control polymerization was conducted wherein the same total amount of SMAB was added initially with the other reactants. The polymer was recovered and the filtrate was analyzed for SCAB as described above.

The results are set out in Table II.

TABLE II

INCREMENTAL SMAB ADDITION: INFLUENCE OF INITIAL SMAB CONTENT IN REACTOR WITH REMAINING SMAB ADDED DURING THE POLYMERIZATION

| Sample | Initial SMAB, mol | Wt % SCAB acid | Mol % SCAB per mol DCB |
|---|---|---|---|
| Control | 1.03 | 0.196 | 2.21 |
| A | 0.50 | 0.093 | 1.20 |
| B | 0.03 | 0.020 | 0.23 |
| C | 0.00 | stinker[a] | — |

[a]Foul smelling product mixture that was not analyzed.

EXAMPLE III

A computer model which is capable of simulating a PPS polymerization reaction was employed to determine the effect of the incremental addition of base during the polymerization on the molecular weight of the polymer and on the efficiency of p-dichlorobenzene (DCB) conversion to polymer.

Figure 2:
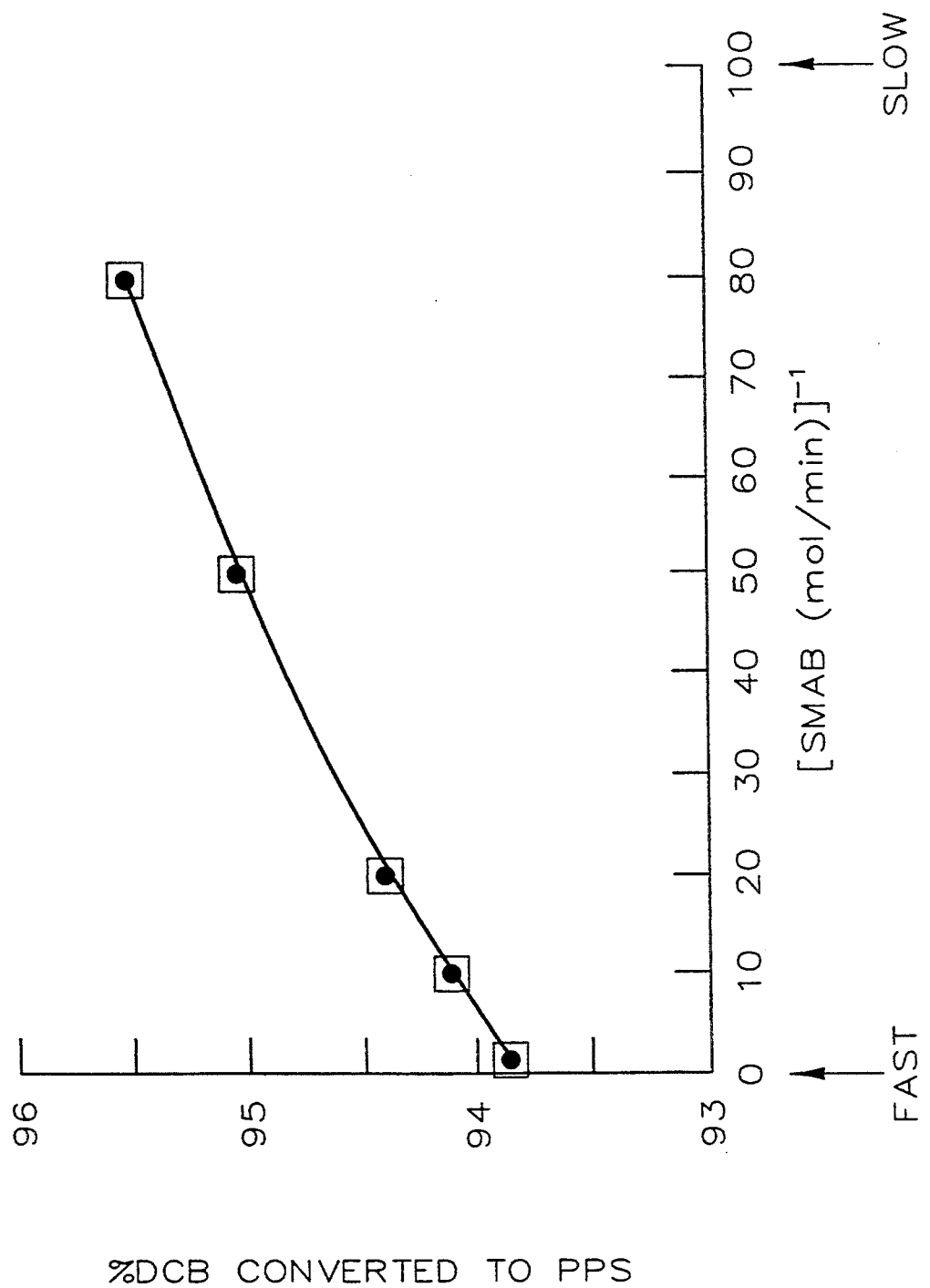
FIG. 2 graphically represents the relationship between the efficiency of the reactant dichlorobenzene (DCB) conversion to PPS and the incremental addition of SMAB as a reactant.

The computer model used was based on experimental studies of model reactions believed to be relevant to PPS growth. The reactions include growth step reactions, intramolecular cyclization reactions, and side reactions. Reaction rate constants for a selected group of growth step and side reactions were determined by direct experimental measurement, and rate constants for cyclization reactions were determined in an iterative computation method. The thus determined reaction rate constants for the group of reactions that best resolve PPS growth, based on a step polymerization concept, were incorporated in a program used for solving a set of ordinary differential equations describing the variation of moments of distributions of various species necessary for PPS synthesis in a batch reaction carried out in a medium of a cyclic amide. The computer model was modified to allow calculations based on the addition of a base incrementally or continuously. The model was verified by the results of experimental runs prior to employing it to calculate the polymer molecular weights and DCB conversions which are depicted in FIGS. 1 and 2, respectively.

The model assumed the following polymerization recipe and conditions for all calculations:

| NaSH | 1 mole |
|---|---|
| DCB | 1 mole |
| NMP | 3.5 moles |
| Base | 0.6 moles present initially |

The simulation added a total amount of 0.5 moles base during the first hold period (40 minutes at 230° C.) at various addition rates. After the 40 minutes, the temperature was increased to 265° C. at a rate of 2.333° C./min., then held at that temperature for 80 minutes. A summary of the experiments and results are set out in Table III.

TABLE III

| Results | Base Add. Rate (mol/min) | Mw | % Efficiency of DCB Converted to PPS[a] |
|---|---|---|---|
| Run Control | 1 | 17970 | 93.85 |
| 1 | 0.1 | 18059 | 94.12 |
| 2 | 0.05 | 18490 | 94.41 |
| 3 | 0.02 | 20820 | 95.05 |
| 4 | 0.0125 | 23450 | 95.52 |

TABLE III-continued

| Results | Base Add. Rate (mol/min) | Mw | % Efficiency of DCB Converted to PPS[a] |
|---|---|---|---|

[a]Calculated as: $\frac{\text{DCB consumed} - \text{DCB consumed in side products}}{\text{DCB consumed}} \times 100$ Both sets of data show that by adding the base slowly to the reaction an improvement can be obtained (>30% increase in Mw of PPS and a 1.67% increase in DCB efficiency).

The results demonstrate that Mw is maximized and higher efficiency of DCB conversion to polymer occurs when the base is added incrementally to the polymerization.

That which is claimed is:

1. A poly(arylene sulfide) polymerization process which comprises:

contacting a polymerization mixture comprising at least one dihaloaromatic compound having the formula

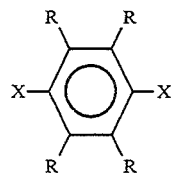

where each X is selected from the group consisting of chlorine, bromine, and iodine, and each R is individually selected from the group consisting of hydrogen and a hydrocarbyl group, wherein the hydrocarbyl group is selected from the group consisting of an alkyl group, a cycloalkyl group, an aryl group or combinations thereof and wherein the total number of carbon atoms in each group is within the range of 6 to about 24, a sulfur source, and a polar organic compound selected from the group consisting of amides and sulfones with at least one suitable base under polymerization conditions of a temperature within the range of about 170° C. to about 325° C., for a period in the range of about 10 minutes to about 72 hours, wherein said at least one suitable base is added slowly and continuously, or in small portions at spaced intervals, to said polymerization mixture during said polymerization, and wherein said suitable base is non-nucleophilic and soluble in said polymerization mixture.

2. A process according to claim 1 wherein said polymerization mixture further comprises a molecular weight modifying agent selected from the group consisting of alkali metal carboxylates, lithium halides, and water.

3. A process according to claim 2 wherein said molecular weight modifying agent is an alkali metal carboxylate.

4. A process according to claim 3 wherein said alkali metal carboxylate is sodium acetate.

5. A process according to claim 2 wherein said molecular weight modifying agent is water.

6. A process according to claim 1 wherein the molar ratio of the amount of said dihaloaromatic compound to said sulfur source is in the range of about 0.8/1 to about 2/1.

7. A process according to claim 1 wherein the molar ratio of the amount of said polar organic compound to said sulfur source is in the range of about 1/1 to about 10/1.

8. A process according to claim 1 wherein the molar ratio of said suitable base to said sulfur source is in the range of about 0.5/1 to about 4/1.

9. A process according to claim 1 wherein said at least one suitable base is added continuously during the polymerization.

10. A process according to claim 1 wherein a portion of said at least one suitable base is added before the commencement of said polymerization.

11. A process according to claim 10 wherein said at least one suitable base further comprises water.

12. A process according to claim 11 wherein a portion of said at least one base comprising water is contacted with said sulfur source and said polar organic compound under conditions sufficient to remove at least a portion of said water, prior to addition of said dihaloaromatic compound and commencement of said polymerization.

13. A process according to claim 11 wherein a portion of said at least one suitable base is contacted with said polymerization mixture after commencement of the polymerization at any point in time after about 40 mole percent conversion of the dihaloaromatic compound.

14. A process according to claim 1 wherein said at least one suitable base is contacted with said polymerization reaction mixture at spaced time intervals after commencement of polymerization until termination of said polymerization.

15. A process according to claim 1 wherein said suitable base is an alkali metal aminoalkanoate.

16. A process according to claim 15 wherein said alkali metal aminoalkanoate is sodium N-methyl-4-aminobutanoate.

17. A polymer prepared by the process of claim 1.

* * * * *